United States Patent
Bissonnette et al.

(10) Patent No.: US 6,952,524 B2
(45) Date of Patent: Oct. 4, 2005

(54) FLUID HEATER TEMPERATURE BALANCING APPARATUS

(75) Inventors: Lee A. Bissonnette, Clarkston, MI (US); Franck Faucon, St. Georges les Baillargeaux (FR)

(73) Assignee: Valeo Electrical Systems, Inc., Auburn Hills, MI (US)

(*) Notice: Subject to any disclaimer, the term of this patent is extended or adjusted under 35 U.S.C. 154(b) by 148 days.

(21) Appl. No.: 10/306,035

(22) Filed: Nov. 27, 2002

(65) Prior Publication Data

US 2004/0101293 A1 May 27, 2004

(51) Int. Cl.[7] .................................................. F24H 1/10
(52) U.S. Cl. ........................ 392/484; 137/334; 392/479
(58) Field of Search .............................. 392/465, 466, 392/480, 484; 137/334–341

(56) References Cited

U.S. PATENT DOCUMENTS

| | | | |
|---|---|---|---|
| 653,629 A | 7/1900 | Schneider | |
| 941,215 A | * 11/1909 | Wade | ................... 392/494 |
| 1,523,156 A | 1/1925 | Adams | |
| 1,636,190 A | 7/1927 | Mattoney | |
| 2,833,909 A | 5/1958 | Levey | ................... 219/39 |
| 3,014,251 A | 12/1961 | Sstern | ................... 20/40.5 |
| 3,202,447 A | 8/1965 | Whaley | ................... 294/87.2 |
| 3,292,866 A | 12/1966 | Benner | ................... 239/284 |
| 3,332,045 A | 7/1967 | Rodaway | ................... 335/81 |
| 3,338,476 A | 8/1967 | Marcoux | ................... 222/146 |
| 3,489,884 A | 1/1970 | Wasekeski | ................... 219/522 |
| 3,553,428 A | 1/1971 | McGhee | ................... 219/494 |
| 3,632,042 A | 1/1972 | Goulish | ................... 239/130 |
| 3,668,757 A | 6/1972 | Rieden | ................... 29/157.3 |
| 3,756,510 A | 9/1973 | Nitterl | ................... 239/129 |

(Continued)

FOREIGN PATENT DOCUMENTS

| | | |
|---|---|---|
| CA | 1216713 | 1/1987 |
| CA | 2133592 | 4/1995 |
| CA | 2176539 | 11/1997 |
| DE | 854 403 | 11/1952 |
| DE | 23 53 738 | 9/1980 |
| DE | 3430 653 | 8/1984 |
| DE | 3 507 900 | 11/1986 |
| DE | 35 26 430 | 5/1987 |
| DE | 39 07 968 | 9/1990 |
| DE | 195 04 470 | 8/1996 |
| DE | 19820220 | 11/1999 |
| DE | 19935134 | 1/2001 |
| DE | 100 63 851 | 7/2002 |
| EP | 1 006 029 | 11/1999 |
| EP | 1 006 030 | 11/1999 |
| EP | 1 213 197 | 12/2000 |
| EP | 1162118 | 12/2001 |
| FR | 2 585 311 | 1/1987 |
| FR | 2 605 273 | 4/1988 |
| FR | 2 609 437 | 7/1988 |
| FR | 2 677 939 | 12/1992 |
| FR | 2 707 230 | 7/1993 |

(Continued)

Primary Examiner—Thor Campbell
(74) Attorney, Agent, or Firm—J. Gordon Lewis

(57) ABSTRACT

A fluid heater apparatus supplies heat to wash fluid via a flow path in a thermally conductive body. A heat source is disposed in the thermally conductive body for imparting heat to the body. Fluid flowing through the thermally conductive body in a flow path enveloping the heat source to absorb heat from the body. A seal member and a metal plate are fixed to one surface of the thermal body. A high thermally conductive pad is disposed between a printed circuit board carrying a control with heat generating switch elements. The pad conducts heat generated by control switching elements to the plate to reduce the temperature differential between the plate and the thermally conductive body to balance the temperature of the heater apparatus.

34 Claims, 5 Drawing Sheets

U.S. PATENT DOCUMENTS

| | | | |
|---|---|---|---|
| 3,785,359 A | 1/1974 | Whittaker | 126/19.5 |
| 3,888,412 A | 6/1975 | Lundo | 237/12.3 B |
| 3,891,827 A | 6/1975 | Wyse | 219/302 |
| 3,977,436 A | 8/1976 | Larmor | 137/625.65 |
| 3,979,068 A | 9/1976 | Applebaum | 239/284 R |
| 4,106,508 A | 8/1978 | Berlin | 128/346 |
| 4,159,026 A | 6/1979 | Williamson | 137/625.5 |
| 4,177,375 A | 12/1979 | Meixner | 219/441 |
| 4,199,675 A | 4/1980 | Sharpless | |
| 4,212,425 A | 7/1980 | Schlick | 239/133 |
| 4,248,383 A | 2/1981 | Savage | 239/284 |
| 4,253,493 A | 3/1981 | English | 137/625.18 |
| 4,295,111 A | 10/1981 | Frosch | 335/256 |
| 4,295,769 A | 10/1981 | Douthett | 411/411 |
| 4,306,589 A | 12/1981 | Harned | 137/625.65 |
| 4,343,988 A * | 8/1982 | Roller et al. | 392/467 |
| 4,358,652 A | 11/1982 | Kaarup | 219/10.55 |
| 4,403,756 A | 9/1983 | Berlin | 244/223 |
| 4,417,116 A | 11/1983 | Black | |
| 4,430,994 A | 2/1984 | Clawson | 128/203.27 |
| 4,489,863 A | 12/1984 | Horehos | 222/504 |
| 4,524,797 A | 6/1985 | Lungu | 137/343 |
| 4,534,539 A | 8/1985 | Dettmann | 251/65 |
| 4,561,632 A | 12/1985 | Hugler | 251/129.15 |
| 4,574,841 A | 3/1986 | Hugler | 137/625.44 |
| 4,589,374 A | 5/1986 | Farina | 122/14 |
| 4,669,430 A | 6/1987 | Reinhold | 123/179 |
| 4,687,907 A * | 8/1987 | Barkley et al. | 392/473 |
| 4,689,548 A | 8/1987 | Mechlemburg | 323/243 |
| 4,690,371 A | 9/1987 | Bosley | 251/65 |
| 4,832,262 A | 5/1989 | Robertson | 239/129 |
| 4,858,576 A | 8/1989 | Jeffries | 123/145 |
| 4,877,186 A | 10/1989 | Scholl | 239/75 |
| 4,894,520 A | 1/1990 | Moran | 219/497 |
| 4,905,904 A | 3/1990 | Ohara | 239/284.1 |
| 4,927,060 A | 5/1990 | Snowball | 222/146.5 |
| 4,975,630 A | 12/1990 | Ma | 323/300 |
| 5,012,977 A | 5/1991 | Karklins | 239/284.1 |
| 5,074,471 A | 12/1991 | Baumgarten | 239/284.1 |
| 5,168,595 A | 12/1992 | Naylor, Jr. | 15/250.4 |
| 5,180,896 A | 1/1993 | Gibby | 219/10.55 |
| 5,183,099 A | 2/1993 | Bechu | 165/41 |
| 5,247,148 A | 9/1993 | Mencher | 219/10.55 |
| 5,249,623 A | 10/1993 | Muller | 165/156 |
| 5,254,083 A | 10/1993 | Gentelia | 604/35 |
| 5,280,806 A | 1/1994 | Glazebrook | 137/517 |
| 5,289,698 A | 3/1994 | Garimella | 62/498 |
| 5,318,071 A | 6/1994 | Giaardo | 137/625.65 |
| 5,345,968 A | 9/1994 | Day | 137/625.46 |
| 5,351,934 A | 10/1994 | Jensen | 251/65 |
| 5,354,965 A | 10/1994 | Lee | 219/202 |
| 5,369,247 A | 11/1994 | Doljack | 219/485 |
| 5,383,247 A | 1/1995 | Nickel | 15/250.04 |
| 5,421,727 A | 6/1995 | Stevens | |
| 5,428,206 A | 6/1995 | Uchida | 219/505 |
| 5,433,382 A | 7/1995 | Baumgarten | 239/284.1 |
| 5,598,502 A | 1/1997 | Takahashi et al. | 392/502 |
| 5,636,407 A | 6/1997 | Len | 15/250.19 |
| 5,673,360 A | 9/1997 | Scripps | 392/405 |
| 5,676,868 A | 10/1997 | Simmons | 219/202 |
| 5,727,769 A | 3/1998 | Suzuki | 251/129.15 |
| 5,784,751 A | 7/1998 | Tippets | 15/250.04 |
| 5,881,428 A | 3/1999 | Simmons | 15/250.04 |
| 5,927,608 A | 7/1999 | Scorirobli | 239/284.1 |
| 5,947,348 A | 9/1999 | Briski | 222/640 |
| 5,979,796 A | 11/1999 | Ponziani | 239/284.1 |
| 5,988,529 A | 11/1999 | Suhring | 239/284.1 |
| 6,009,369 A | 12/1999 | Boisvert | 701/99 |
| 6,119,300 A | 9/2000 | Schmid | 15/250.04 |
| 6,148,258 A | 11/2000 | Boisvert | 701/99 |
| 6,175,688 B1 * | 1/2001 | Cassidy et al. | 392/470 |
| 6,199,587 B1 | 3/2001 | Shlomi | 137/625.5 |
| 6,236,019 B1 | 5/2001 | Piccione | 219/203 |
| 6,247,653 B1 | 6/2001 | Seyfarth | 239/284.1 |
| 6,257,500 B1 | 7/2001 | Petzold | 239/284.1 |
| 6,260,608 B1 | 7/2001 | Kim | 165/41 |
| 6,271,506 B1 | 8/2001 | Glaser | 219/505 |
| 2002/0040895 A1 | 4/2002 | Lopez et al. | |
| 2002/0137455 A1 | 9/2002 | Ivanov et al. | |

FOREIGN PATENT DOCUMENTS

| | | |
|---|---|---|
| GB | 370687 | 5/1931 |
| GB | 1 318 498 | 5/1973 |
| GB | 1 451 666 | 10/1974 |
| GB | 2 044 601 | 10/1980 |
| GB | 2 121 681 | 1/1984 |
| GB | 2 225 096 | 5/1990 |
| GB | 2 260 399 | 4/1993 |
| GB | 2 271 276 | 4/1994 |
| GB | 2 271 712 | 4/1994 |
| GB | 2 290 461 | 1/1996 |
| GB | 2 308 971 | 7/1997 |
| GB | 2 310 795 | 9/1997 |
| GB | 2 331 231 | 5/1999 |
| GB | 2354 688 | 11/2000 |
| GB | 2 350 555 | 12/2000 |
| JP | 63-93652 | 4/1988 |
| JP | 2053656 | 2/1990 |
| JP | 2234866 | 9/1990 |
| JP | 4-38248 | 2/1992 |
| JP | 8312824 | 11/1996 |
| WO | WO 9746431 | 12/1997 |
| WO | WO 98/49036 | 11/1998 |
| WO | WO 98/58826 | 12/1998 |
| WO | WO 99/56993 | 11/1999 |
| WO | WO 00/04754 | 2/2000 |
| WO | WO 00/27540 | 5/2000 |
| WO | WO 02/92237 | 11/2002 |

* cited by examiner

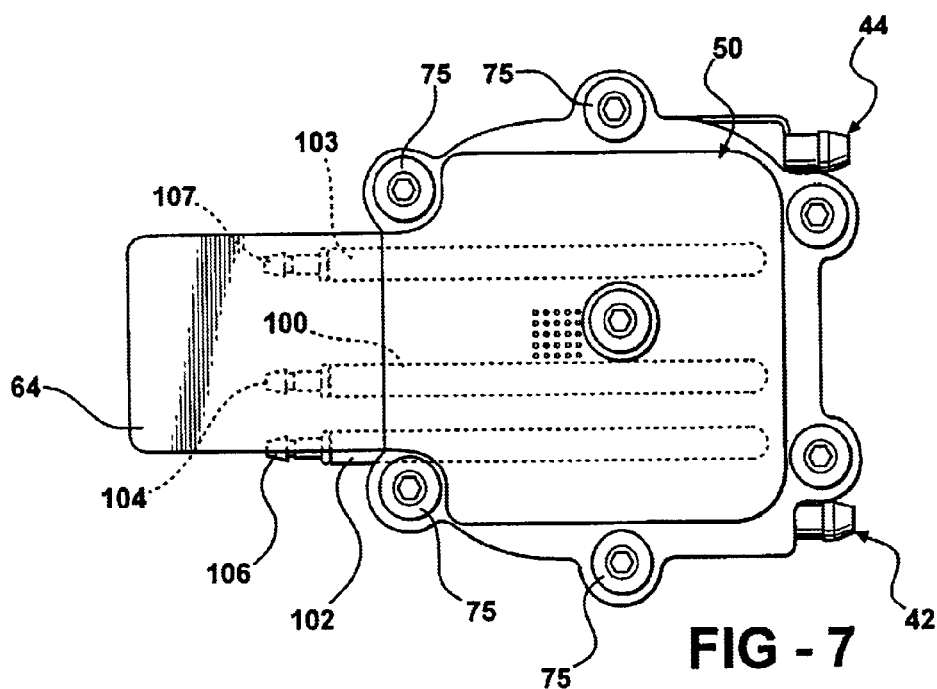
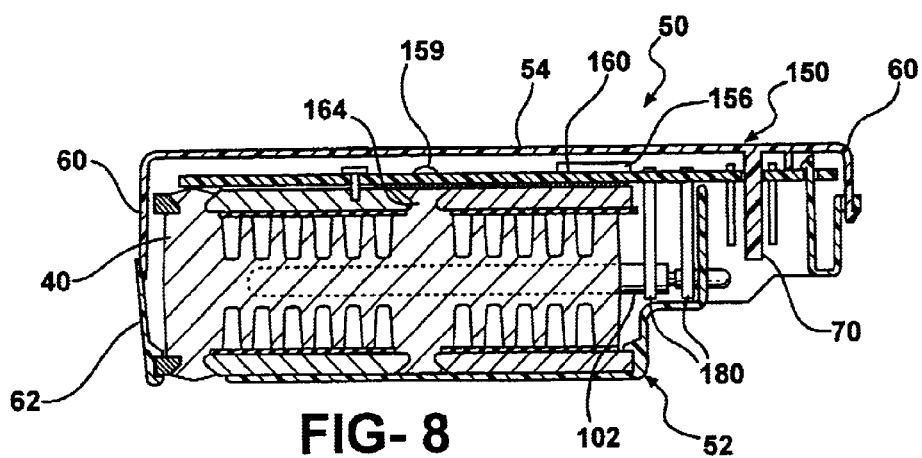
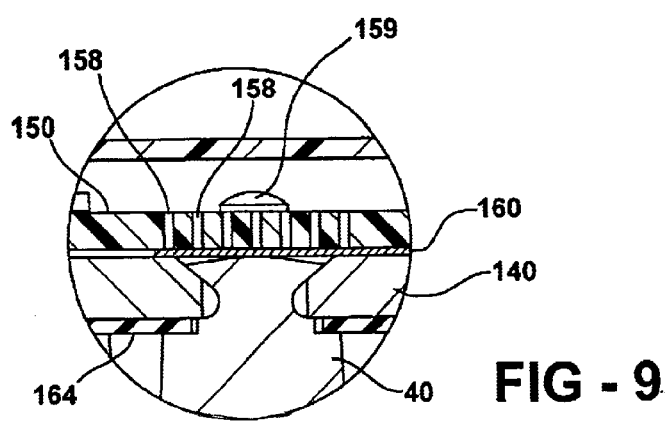

FLUID HEATER TEMPERATURE BALANCING APPARATUS

BACKGROUND

This invention relates, in general, to fluid heater apparatus and, more particularly, to fluid heater apparatus which provide a heated wash fluid to a cleanable surface, and, still more specifically, to a heated wash fluid apparatus for a vehicle windshield wash system.

It is necessary in many diverse applications to quickly elevate the temperature of a fluid to a higher use temperature. For example, it is desirable to be able to provide instant hot water, for use in homes, offices and campers, as well as for industrial processes.

In cleaning applications, it is known that hot fluid removes dirt and other debris from a surface much better and much faster than colder fluids. One heated fluid application is a vehicle wash fluid system, such as a windshield wash system as well as vehicle wash systems applied to camera lenses, exterior lamps and lamp lenses, mirrors, etc. Vehicles are typically provided with at least one and usually multiple windshield washers which are used to clear the field of vision in a windshield or rear backlight.

Typically, a nozzle or spray device is provided adjacent to or as part of the windshield wiper to disperse a pattern of wash fluid onto the windshield prior to and during the wiping operation to improve the efficiency of the wiping operation so as to provide a clear field of vision for the driver or vehicle passengers. The wash fluid is typically stored in a reservoir in the engine compartment and is pumped through the spray device upon manual activation of a control actuator by the vehicle driver.

Since it is known that warm or heated fluid provides better cleaning efficiency than cold fluid, it is known to provide a heated wash fluid to a vehicle window spray device. Various wash fluid heating devices have been developed, but all typically utilize a heat exchanger design wherein a heat source is disposed in a body through which the wash fluid flows. The wash fluid picks up heat in the heat exchange body which elevates its temperature prior to dispersion through the spray nozzle onto a vehicle window.

However, such prior wash fluid heating devices are inefficient in terms of heat transfer capability as well as being able to only provide a small quantity or a short duration of heated wash fluid onto a vehicle window. Further, direct contact of the fluid with the heat source causes higher temperature hot spots in the fluid and lower temperature fluid portions which do not contact the heat source.

The control circuit used to operate such windshield wash fluid heating devices must provide high amperage such as 50 amps at 12 volts. The switching devices in the control circuit, which typically utilize MOSFETs, generate considerable heat themselves, but still must be thermally insulated from the heated fluid.

However, the temperature of the primary heating source and the heated fluid is much greater than the heat generated by the MOSFETs so that heat escaping from the thermal mass of the body of the heating device heats the upper portion of the heating device if the temperature gradient between the heating device and the surrounding ambient temperature across the upper plate or surface of the heating device is too high.

Thus, it would be desirable to provide a fluid heater apparatus which provides a heated fluid in an efficient manner, which has improved operating efficiency, which provides heat balancing for the thermal mass, which balances the heating device temperature, and which reduces power consumption.

SUMMARY

The present invention is a heater apparatus for elevating the temperature of a fluid.

In one aspect, the heater apparatus includes a thermally conductive mass, heating means thermally coupled to the thermally conductive mass for imparting heat to the thermally conductive mass, and a fluid flow path formed in the thermally conductive mass between an inlet and an outlet. Fluid in the fluid flow path absorbs heat from the thermally conductive mass.

In another aspect, the present invention is a wash apparatus including a fluid reservoir contain a wash fluid, a pump coupled to the fluid reservoir for pumping fluid from the reservoir, a spray nozzle fluidically coupled to the pump for discharging fluid pumped from the reservoir onto a cleanable surface, and the heater apparatus disposed in fluid flow communication between the pump, the reservoir and the nozzle.

The inventive apparatus also includes a controller for supplying power to heater elements of the heater apparatus. The controller includes high amperage switching devices, such as MOSFETs mounted on a printed circuit board affixed to an upper plate joined to the thermal mass of the heater apparatus.

According the present invention, a highly thermal conductive pad is located between the upper plate of the housing and a heater core. The pad conducts heat generated by the switching devices on the printed circuit board to the upper housing plate to lower the temperature gradient or differential across the housing so as to balance the temperature of the heating device thereby requiring less electrical power to maintain the heating apparatus at a preselected temperature.

The fluid heater apparatus of the present invention affords a highly efficient heater apparatus which quickly raises and maintains fluid temperature to an operating temperature. The heater apparatus is constructed to provide balanced temperature across the heater for heat loss and reduced power consumption. The high amperage switching devices, such as MOSFETs, utilize the upper plate as a heat sink to inhibit heat loss and additionally reduce power consumption.

BRIEF DESCRIPTION OF THE DRAWING

The various features, advantages and other uses of the present invention will become more apparent by referring to the following detail description and drawing in which:

FIG. 7 is a plan view of the heater module shown in FIG. 4.

FIG. 8 is a longitudinal, cross-sectional view of the heater module shown in FIGS. 2–7; and FIG. 9 is an enlarged, side cross-sectional view of a portion of the heater module shown in FIG. 8.

DETAILED DESCRIPTION

Figure 1:
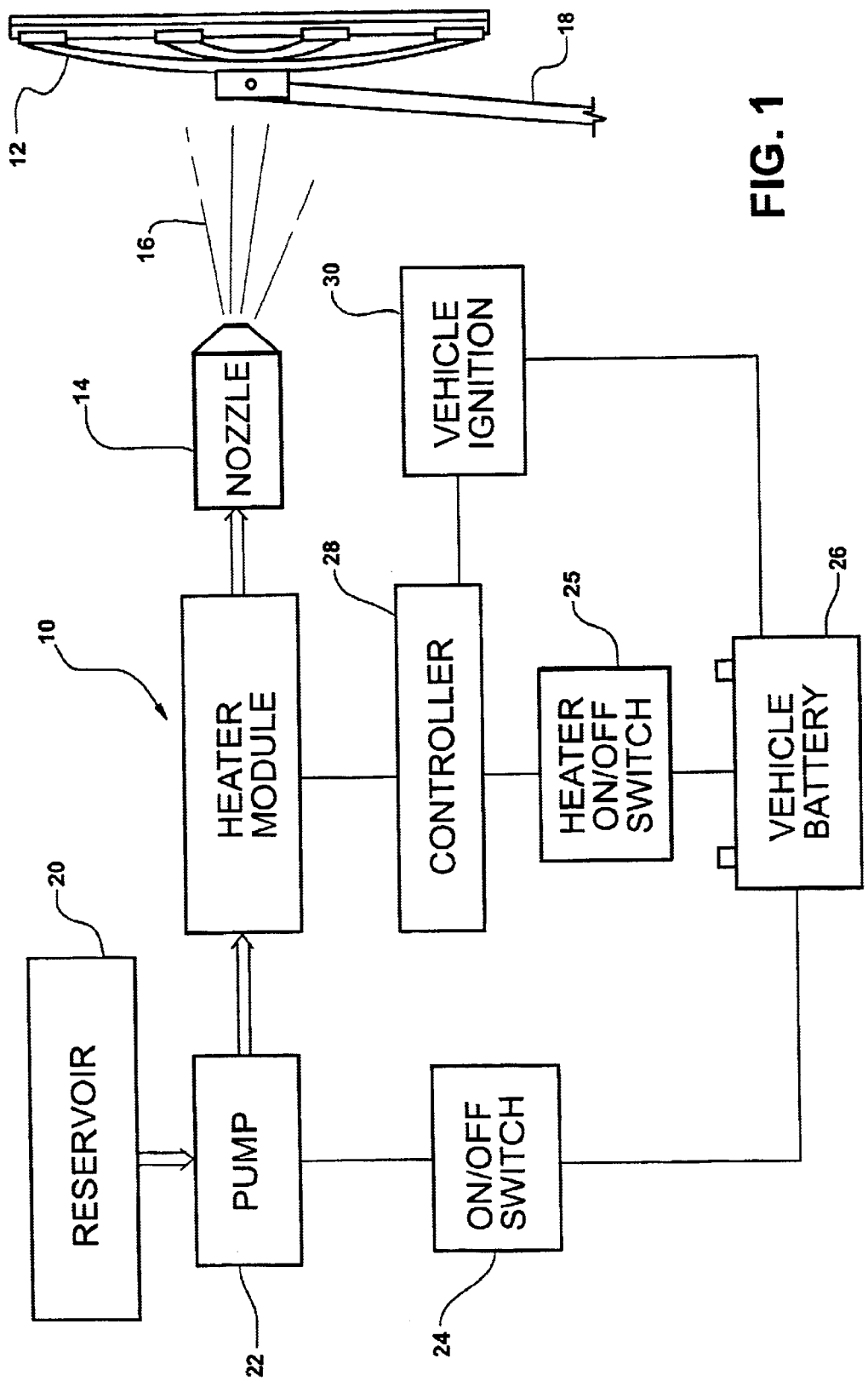
FIG. 1 is a block system diagram of a fluid heater apparatus according to the present invention used in an exemplary vehicle window wash fluid delivery system.
Figure 2:
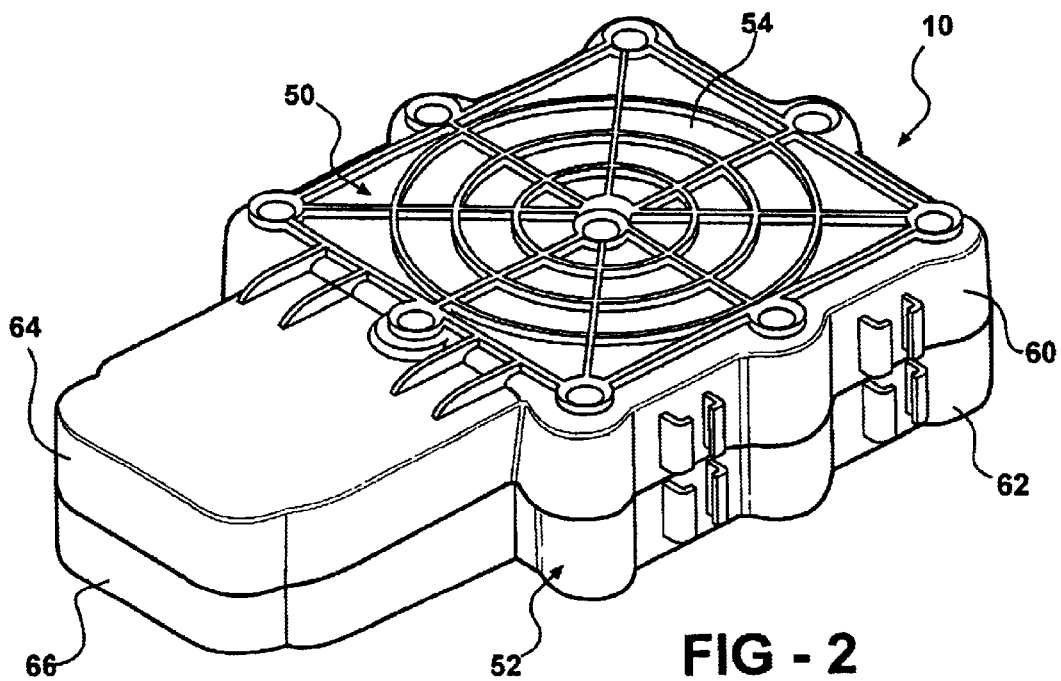
FIG. 2 is a perspective view of a heater module according to one aspect of the present invention.

Referring now to FIG. 1, there is depicted an environment in which a heater apparatus or module 10 constructed in accordance with the teachings of the present invention can be advantageously utilized. Although the following use of the heater module 10 of the present invention is described in conjunction with a vehicle window wash system, it will be understood that the present heater module may be employed in other applications requiring heated fluid, such as any cleaning system used to clean any vehicle window, i.e., the windshield, rear backlight, or side windows, as well as cleaning systems for vehicle mirrors, camera, lenses, or sensor covers, etc.

As is conventional, a vehicle window 12, such as a windshield, rear backlight or window, etc., has one or more fluid delivery devices, such as spray nozzles 14 located in a position to dispense or spray a pattern 16 of wash fluid onto the exterior surface of the window 12. The dispersion of the wash fluid 16 is usually in conjunction with activation of a windshield wiper 18 over the window 12.

The wash fluid 16 is supplied from a fluid source, such as a reservoir or container 20. The fluid in the reservoir 20 is pumped to the nozzle(s) 14 by means of a pump 22 usually located in close proximity or attached to the reservoir 20.

As is conventional, an on/off switch 24, which may be mounted on a vehicle steering column stalk switch, is suppled with power from the vehicle battery 26 and enables the vehicle driver to control the on or off operation of the wash pump 22.

According to the invention, the wash fluid pumped from the reservoir 20 to the spray nozzles 14 is heated from ambient temperature to a predetermined higher temperature, such as 160° F.–170° F., by example only, by the heater module 10. A suitable control circuit or controller 28 is provided for controlling the operation of the heater elements in the heater module 10. The controller 28 is also supplied with electric power from the vehicle battery 26. The controller 28 is activated by a "on" signal from the vehicle ignition 30 so as to heat the fluid contained within the flow paths in the heater module 10, as described hereafter, whenever the vehicle ignition is in an "on" state.

An optional on/off switch 25 may be connected between the battery 26 and the controller 28 to provide on and off operation for the entire heater system by disconnecting power to the controller 28. This enables the heater system to be activated or remain in an inactive state at the selection of the vehicle driver. As described hereafter, the on/off switch 25 may also be replaced by a separate input signal to the controller 28 from an external signal source, such as a vehicle body controller, to provide for selective deactivation of the heater module 10 under certain circumstances, such as a thermal event, low battery power, etc.

Referring now to FIGS. 2–9, there is depicted one aspect of the heater module 10 according to the present invention.

The heater module 10 includes a heat exchange mass or body 40 formed of a suitable high thermally conductive material. Although the mass 40 is described as being formed of diecast, molded or machined aluminum, other materials, either homogenous or non-homogenous, may also be employed. For example, the mass 40 can be formed of alumina particles, ceramic materials, etc.

The mass 40, as described in greater detail hereafter, includes a fluid flow path between an inlet 42 and an outlet 44. The inlet and outlet 42 and 44, respectively, receive a fitting 46 and an outer sleeve 48 which are joined together for receiving a fluid sealed connection to a fluid flow conduit, element or tube, not shown. The inlet 42 will be connected to receive the pump output from the window wash fluid reservoir 20; while the outlet 44 will be connected to the spray nozzle(s) 14.

As vehicles typically have several spray nozzles 14, usually one for each of the two windshield wipers, and at least one nozzle 14 for the rear backlight or rear window wiper, it will be understood that the following description of a single heater module 10 for heating all of the fluid discharge from the fluid reservoir 20 will encompass multiple parallel paths, each containing a separate heater module, for heating fluid from the reservoir 20 for each different nozzle 14.

The heat exchange mass 40 is disposed within an insulated enclosure formed by a first cover 50 and a mating second cover 52. The first and second covers 50 and 52 have complementary shapes with a major wall surface 54 and 56, respectively, and a surrounding peripheral lip 60 and 62, respectively.

A necked-down end portion 64 and 66 is formed in each of the first and covers 50 and 52, and forms an extension from one end of the respective major walls 54 and 56 as well as from the peripheral edge lips 60 and 62. The necked-down portions 64 and 66, when joined together, form an end cavity for receiving a connector assembly 70 which connects electrical conductors to the heating element(s) mounted in the joined first and second covers 50 and 52.

The first and second covers 50 and 52 and the heat exchange mass 40 are fixedly joined together, after the connector assembly 70 has been disposed in the extensions 64 and 66 of the first and second covers 50 and 52 by suitable means, such as by heat stake rivets or projections 76 projecting outwardly from opposite major surfaces of the heat exchange mass 40. The projections 76 engage apertures in the major surfaces 60 and 62 of the first and second housing parts 50 and 52 and are heat welded together to join the first and second housing parts 50 and 52 together in a fixed connection.

Figure 3:
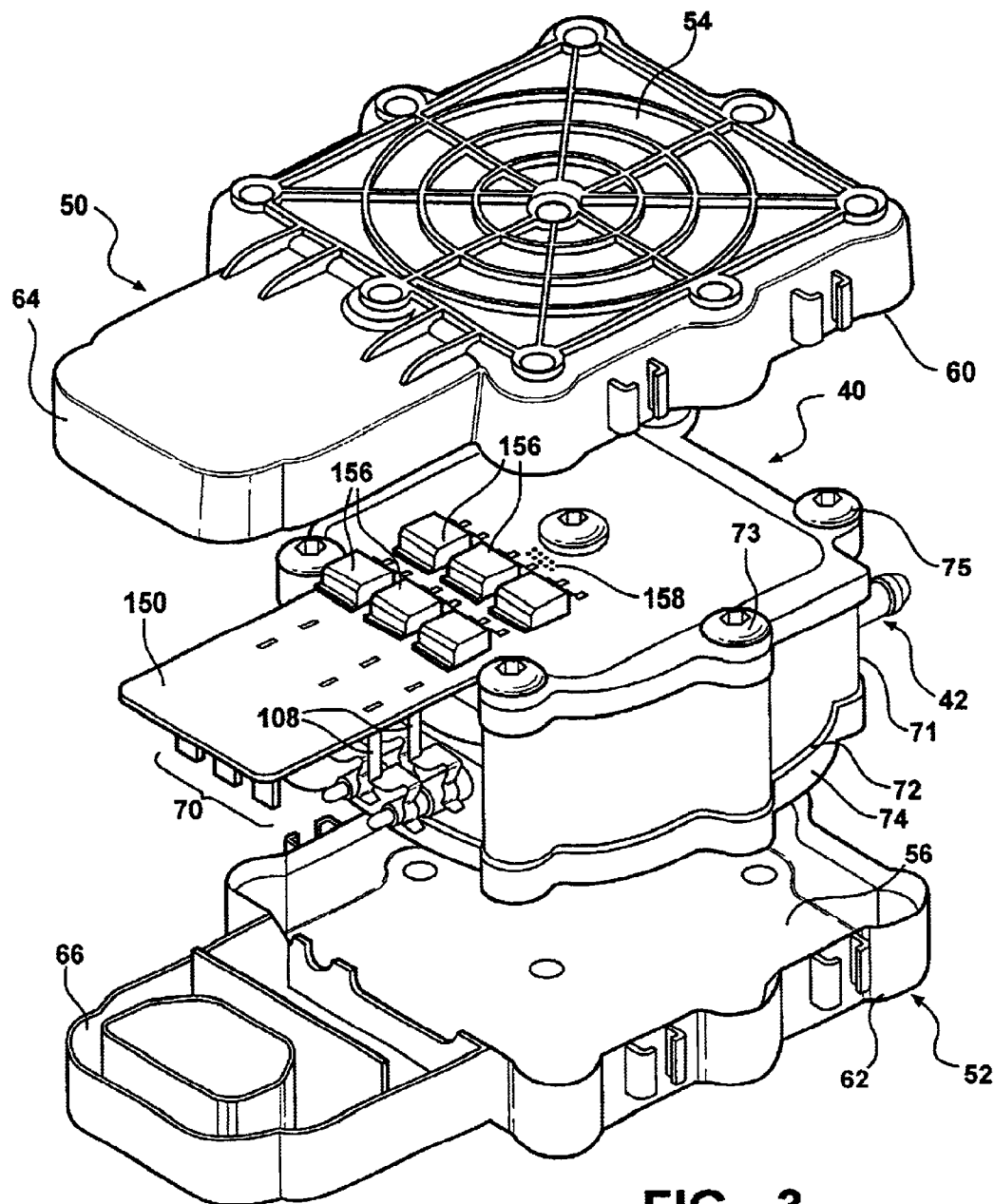
FIG. 3 is an exploded perspective view of the heater module shown in FIG. 2.
Figure 5:
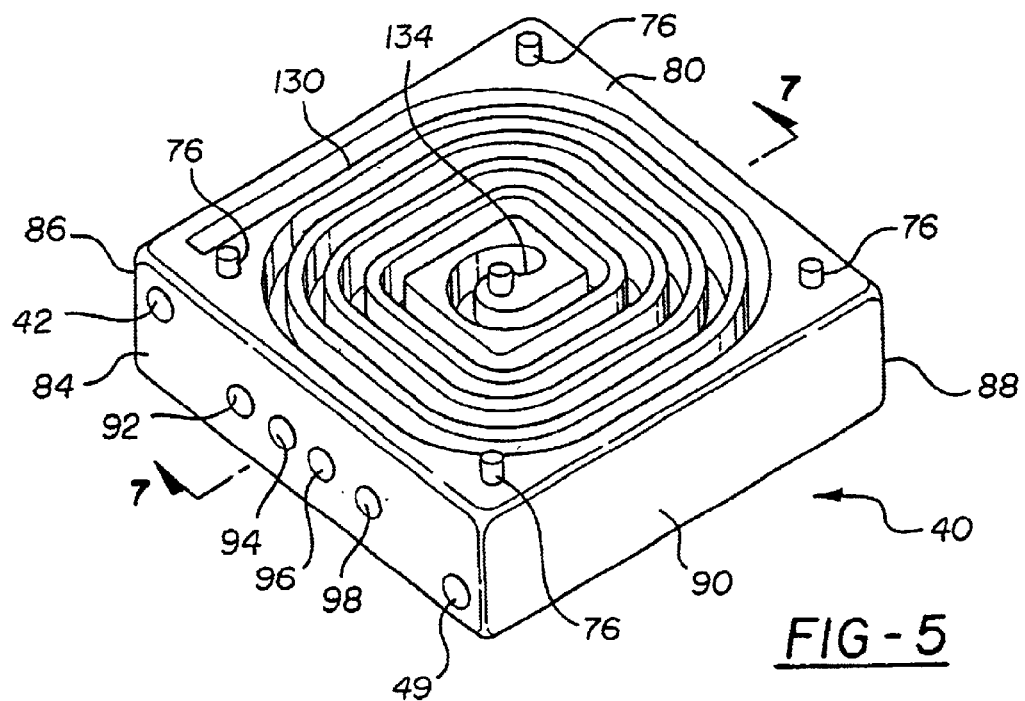
FIG. 5 is a top perspective view of the heater module thermal mass.

A pair of seal elements 71 and 72, each having a peripheral shape substantially the same as the peripheral shape of the heat exchange mass 40 are disposed on opposite surfaces of the heat exchange mass 40 as shown in FIG. 3. The seal members 71 and 72 are formed of a high thermal resistant, insulating material. The seal members 71 and 72 seal the open ends of the flow paths through the heat exchange mass 40 as described hereafter.

Upper and lower plates 73 and 74, each also having a shape complimentary to the shape of the heat exchange mass 40, are disposed in contact with the upper and lower seals 71 and 72, respectively, and fixed thereto by suitable fastening means, such as nuts and bolts 75 which extend through apertures in each of the upper and lower plates 73 and 74, the upper and lower seals 71 and 72 and the heat exchange mass 40. The upper and lower plates 73 and 74 are formed of a good thermal conductive material, such as aluminum.

As shown in detail in FIGS. 4–7, the heat exchange mass 40 has a solid cubical shape formed of a first major surface 80, a second opposed major surface 82, and four sidewalls 84, 86, 88 and 90, interconnecting the first and second surfaces 80 and 82.

A plurality of bores 92, 94, 96 and 98 are formed in the body 40 and project inwardly from the sidewall 84. The bores 92, 94, 96 and 98 are each adapted for receiving one generally cylindrical heater element. As partially shown in FIG. 7, each bore extends through the solid central portion of the mass 40 so as to be completely surrounded by the solid material of the mass 40. This defines the mass 40 as a heat source after receiving heat from activation of the heater elements describe hereafter.

In the aspect of the invention shown in FIGS. 3 and 7, the heater elements are formed of "calrod". Although different materials many be used, one example of a calrod construction is a Nichrome wire inside of a stainless steel sheath.

By way of example only, at least one and preferably a plurality, i.e., two or three or more individual heater elements 100, 102 and 103, with only heater elements 100, 102 being shown in FIG. 3, are disposed in the bores 96, 94 and 98. The function of the one or more heater elements, such as heater elements 100 and 102, will be described hereafter in conjunction with the description of the heater module 10.

Figure 4:
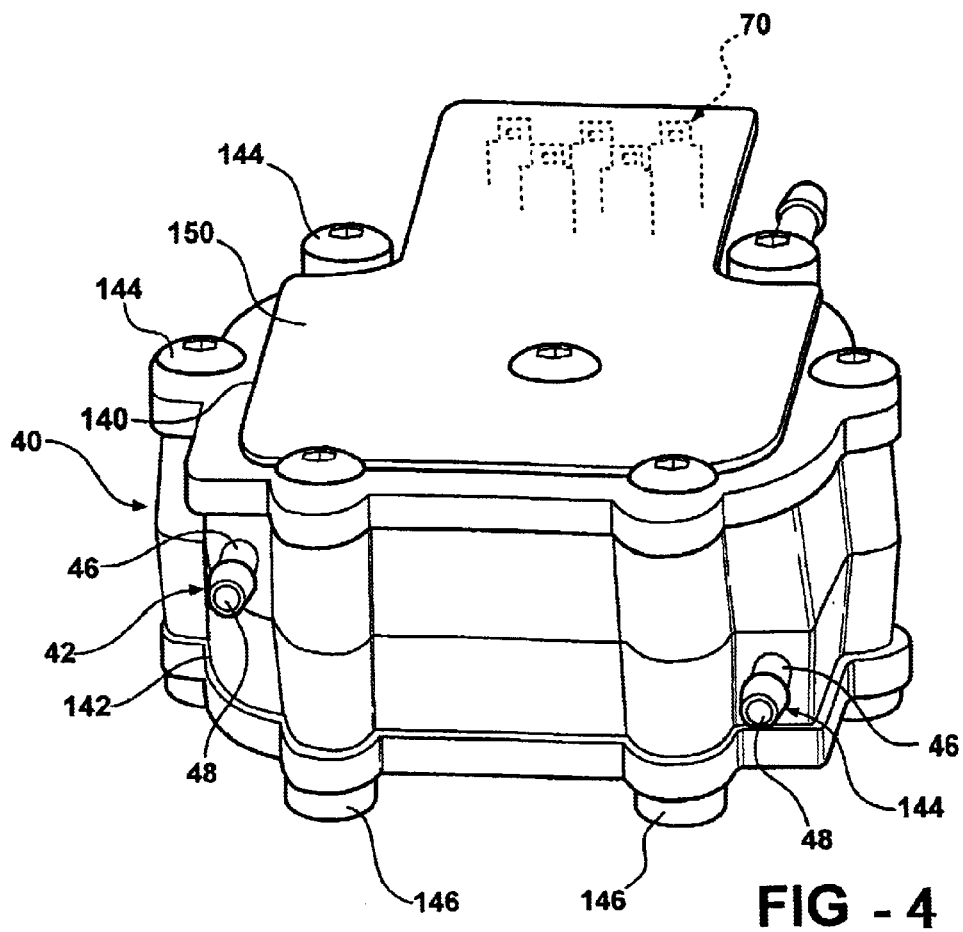
FIG. 4 is a perspective view, taken from the right side of FIG. 3, of the heater module of the present invention.

As seen in FIGS. 4 and 7, one end 104, 106 and 107 of each heater element, elements 100, 102 and 103, respectively, projects outwardly through the sidewall 84 of the body 40. The ends 104, 106 and 107 of the heater elements 100, 102 and 103 respectively, engage individual terminals 108 extending from a printed circuit board 150 mounted by means of fasteners, adhesives, etc., to an exterior surface of the upper plate 73. Conductive traces in the printed circuit board connect the terminals 108 with the connector terminals 70 to receive power from the vehicle electrical system.

The circuit board 150 is fixedly mounted by suitable fasteners such as screws. One of the terminals 108 acts as a ground lead in that an end portion is disposed in contact with the outer stainless steel sheath of each heater element or calrod 100, 102 and 103. Another of the terminals 108 is the power lead for calrod 100. This terminal 108 provides electric power to the calrod 100 through contact with the end 104 of heater element 100 in the grid assembly 110.

The other two terminals 108 provide power connections to the other two heater elements 102 and 103. A switch, not shown, may be interposed between the terminal 108 and the other two terminals 108 to selectively provide power to the other two terminals 108 when power is supplied to the power terminal. This switch can be a bi-metal switch, for example, which will open at a predetermined temperature, such as 50° C., as described hereafter. Alternately, a switch controlled by the circuitry on the circuit board 150 of the controller 28 will selectively connect power from the power terminal 108 to the other terminals 108. This provides the controller 28 with the capability, when receiving suitable external input signals from the vehicle body controller, for example, to deactivate the heater module 10, during the occurrence of low vehicle battery power, a thermal event, etc.

As shown in FIGS. 4–7, the thermally conductive mass 40 includes a fluid flow channel or path which extends from the inlet 42 to the outlet 44. The fluid flow path has a labyrinthian path formed of a first fluid flow path portion 130 and a second fluid flow path or channel 132 which are connected at a generally centrally disposed bore 134. The first fluid flow channel 130 has a generally spiral shape formed of alternating straight and arcuate sections which alternate create laminar and turbulent flow of the fluid passing through the first flow channel 130 to maximize the heat absorption of the fluid from the adjoining walls of the mass 40. Further, the first fluid flow channel 130 has an inward directed spiral shape from the inlet 42 to the bore 134 to minimize temperature differential between adjoining portions of the spiral shaped first flow channel 130.

Figure 6:
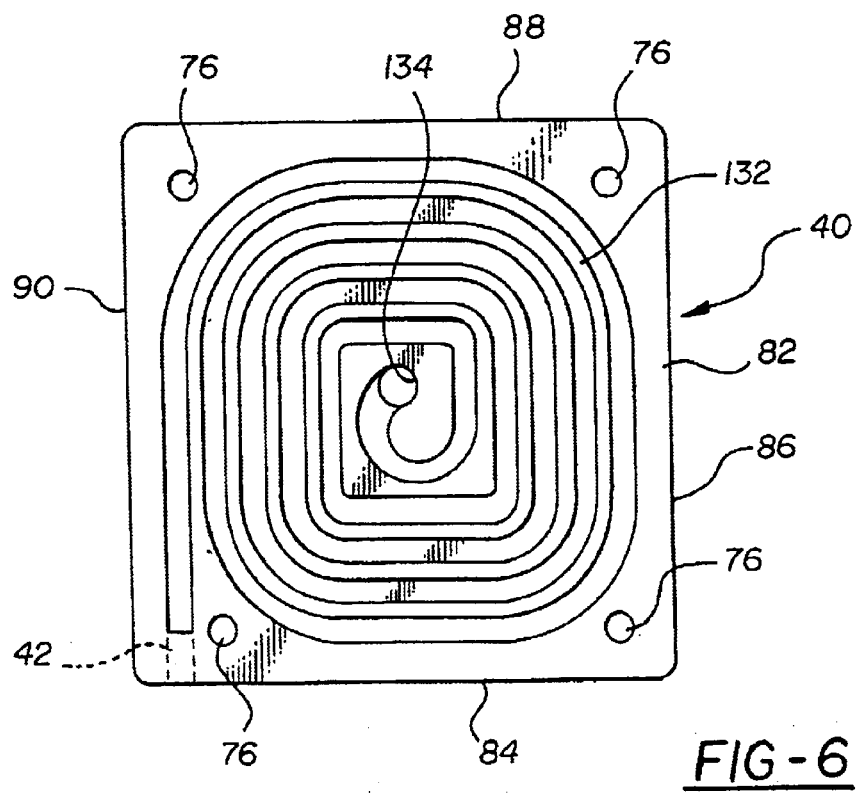
FIG. 6 is a bottom elevational view of the heater module thermal mass shown in FIG. 5.

As shown in FIG. 6, the second fluid flow channel 132 has a substantially identical spiral shape. However, fluid flow through the second fluid flow channel 132 is in a outward spiral direction from the bore 134 to the outlet 44. As described above, the seal members 71 and 72 sealingly close the open ends of the first and second fluid flow channels 130 and 132.

Thus, fluid flow through the first and second flow channels 130 and 132 starts from the inlet 44 then continues in a spirally inward directed manner through the first flow channel 130 to the central passage or bore 134. Upon exiting the central passage 134 into the second flow channel 132, fluid flow progresses in an outward spiral direction through the second flow channel 132 to the outlet 44.

In operation, the heater module 40 will be interconnected in the vehicle wash fluid flow lines between the pump 22 and the spray nozzle(s) 14 as shown in FIG. 1. The external connector is then connected to the connector housing 70 to provide electric power from the vehicle battery 26 and the controller 28 to the heater elements 100, 102 and 103, in the heat exchange body 40.

Assuming that the first and second fluid flow channels 130 and 132 in the body 40 are filled with fluid, when the controller 28 activates the heater elements 100, 102 and 103, the heater elements 100, 102 and 103 will begin radiating heat which will immediately raise the temperature of the entire surrounding portion of the heat exchange body 40. Heat from the body 40 will, in turn, be radiated to and absorbed by the fluid disposed in the first and second flow channels 130 and 132.

The straight and arcuate portions of the first and second fluid flow channels 130 and 132 create alternating turbulent and laminar flow regions in the fluid flowing through the mass 40 which causes movement of the fluid in the first and second flow channels 130 and 132 bringing all molecules in the fluid in contact with the wall of the body 40 forming the first and second flow channels 130 and 132 to efficiently absorb the maximum amount of heat possible. This causes the temperature of the fluid to be quickly raised from ambient temperature at the inlet 42 to approximately 160° F.–170° F. at the outlet 44 in approximately sixty seconds.

The fluid in the first and second fluid flow channels 130 and 132 removes or absorbs heat from the thermal mass 40 thereby increasing the fluid temperature by physical contact with the mass 40. The heater elements 100, 102 and 103 maintain the heat of the thermal mass 40 at a predetermined temperature thereby preventing hot spots from occurring in the fluid. Normally, hot spots would occur when the fluid comes in direct contact the heater elements 100, 102 and 103. Fluid which is not in physical contact with the heater elements 100, 102 and 103 passes the heater elements 100, 102 and 103 by and does not absorb heat. By heating the thermal mass 40, the physical hot contact area is increased along with an increase in heat transfer efficiency. This requires less energy to heat the same volume of fluid.

Although a single heater element 100 may be employed as the heat source in the body 40, multiple heater elements, with two or three heater elements, 100, 102 and 103, being described by way of example only, have been found to be most advantageous. The controller 28 can activate all of the plurality of heater elements 100. 102 and 103 upon receiving a first command to dispense heated wash fluid onto the windshield 12. This generates a maximum amount of heat to the body 40 to immediately and quickly raise the temperature of the body 40 high enough to transfer sufficient heat to the fluid in the fluid flow channels 130 and 132 to raise the temperature of the fluid to the desired discharge temperature of 160° F.–170° F. The multiple heater elements 100, 102 and 103 can remain in an activated state by the controller 28 if immediate and successive commands from the on/off switch 24 are supplied by the vehicle driver to supply additional charges of fluid onto the windshield 12.

At the completion of the fluid dispensing operation, and during other periods of non-fluid dispensing while the vehicle ignition is still "on", the controller 28 can cyclically activate one or more of the heater elements, such as heater element 100, to maintain the temperature of the fluid in the first and second flow channels 130 and 132 at an elevated temperature for immediate discharge onto the windshield 12 when activated by the on/off switch 24. This minimizes electrical power requirements on the vehicle battery 26.

Although the controller 28 can provide separate switchable signals to each of the heater elements 100, 102 and 103, in order to control each heater element 100 102 and 103 separately under program or logic control, one simple approach includes a bi-metal element or a switch mounted between the power connections to one terminal 108 and each of the other terminals 108 connected to the additional heater elements 102 and 103. The bi-metal element can be set to open at a predetermined temperature, such as 50° C., thereby deactivating the associated heater element. This enables the additional heater elements 102 and 103, for example, to remain deactivated until a high heat requirement is initiated.

The fasteners 75 also fix the printed circuit board 150 which forms part of the controller 28 onto the heat exchange body 40, typically over the first plate 140.

Although the following description of the use of high amperage switching devices known as MOSFETs, are used as part of the controller 28 and to provide the necessary high current, typically 50 amps at 12 volts, to the heating elements 100, 102 and 103 in the thermal mass 40, other high amperage switching devices may also be employed. Any number of MOSFETs 156 can be mounted in any configuration on the printed circuit board 150.

A plurality of bores 158 are optionally formed through the printed circuit board 150. The bores 158 improve heat flow between the switching devices on the printed circuit board (PCB) 150 and the underlying first plate 73.

A temperature sensor 159, such as a PTD, is mounted on the printed circuit board 150, typically over or adjacent to the bores 158. The temperature sensor 159 measures the temperature of the printed circuit board 150 and provides a temperature proportional signal to the controller 28 which is used by the controller 28 to control the on/off cycle of the heating elements 104, 106 and 107.

To further enhance transfer of the heat generated by the MOSFETs 156 to the first plate 140, a highly conductive pad or plate 160, hereafter referred to as a sill pad 160, is interposed in contact between the printed circuit board 150 and the first plate 73 as shown in FIGS. 3, 8 and 9. The sill pad 160 typically has a planar shape and dimensions to extend over at least a portion of the first plate 73. The pad 160 isolates stray electrical currents to negative ground through the screws 75, provides a positive contact between the MOSFETs and the thermal mass 40, and stabilizes heat loss through the adjacent cover by maintaining the temperature of the plate 73 at a higher temperature to thereby create a lower temperature differential or gradient with respect to the thermal mass 40.

As shown in FIG. 9, a projection 164 extends from the thermal mass 40.

The sill pad 160 preferably has a higher thermal conductivity than the thermal conductivity of the plate 73 to efficiently draw heat generated by the MOSFETs 156 to the plate 73 thereby maintaining the temperature of the plate 73 at an elevated temperature. This elevated temperature of the plate 73 is higher than the normal temperature of the plate 73 caused by heat escaping from the sides of the thermal mass 40 around the seals 71 and 72.

The projection 164 and the thermal mass 40 engage apertures in the plate 73 as shown in FIGS. 8 and 9. A portion of the sill pad 160 extends over one of the projection 164 as shown in FIG. 9 and may be disposed in contact or registry with the projection 164 to provide a direct heat exchange path from the thermal mass 40 to the sill pad 160.

In summary, there has been disclosed a fluid heater apparatus which efficiently heats fluid to a desired discharge temperature with minimum power requirements. The fluid heater apparatus is provided with a unique temperature balancing means which decreases the temperature differential between the thermal mass and exterior components of the apparatus so as to reduce power consumption required to maintain the heated fluid at a desired discharge temperature.

What is claimed is:

1. A heater apparatus for heating fluid, the heater apparatus comprising:

a thermally conductive mass;

heating means, thermally coupled to the thermally conductive mass, for imparting heat to the thermally conductive mass;

a fluid flow path formed in the mass between an inlet and an outlet, the fluid flow path coupled in heat transfer relation to the heating means so that fluid in the fluid flow path absorbs heat from the thermally conductive mass;

control means, connected to the heating means, for activating the heating means, the control means including a printed circuit board;

a thermally conductive medium coupled in heat transfer relationship between at least a portion of the control means and the thermally conductive mass to minimize a temperature differential between the thermally conductive mass and the ambient environment, the thermally conductive medium disposed in contact between the printed circuit board and the thermally conductive mass; and a thermal insulating member disposed between the thermally conductive mass and the thermally conductive medium.

2. A heater apparatus for heating fluid, the heater apparatus comprising:

a thermally conductive mass;

heating means, thermally coupled to the thermally conductive mass, for imparting heat to the thermally conductive mass;

a fluid flow path formed in the mass between an inlet and an outlet, the fluid flow path coupled in heat transfer relation to the heating means so that fluid in the fluid flow path absorbs heat from the thermally conductive mass;

control means, connected to the heating means, for activating the heating means;

a thermally conductive medium coupled in heat transfer relationship between at least a portion of the control means and the thermally conductive mass to minimize a temperature differential between the thermally conductive mass and the ambient environment;

a thermal insulating member disposed on at least one surface of the thermally conductive mass;

a thermally conductive plate joined to the thermal insulating member and the thermally conductive mass; and wherein the thermally conductive medium is disposed in heat transfer relationship between the control means and the thermally conductive plate to transfer heat generated by the control means to the plate.

3. A heater apparatus for heating fluid, the heater apparatus comprising:

a thermally conductive mass;

heating means, thermally coupled to the thermally conductive mass, for imparting heat to the thermally conductive mass;

a fluid flow path formed in the mass between an inlet and an outlet, the fluid flow path coupled in heat transfer relation to the heating means so that fluid the fluid flow path absorbs heat from the thermally conductive mass;

control means, connected to the heating means, for activating the heating means, the control means including a printed circuit board;

a thermally conductive medium coupled in heat transfer relationship between at least a portion of the control means and the thermally conductive mass to minimize a temperature differential between the thermally conductive mass and the ambient environment, the thermally conductive medium disposed in contact between the printed circuit board and the thermally conductive mass; and a thermal insulating member disposed between the thermally conductive mass and the thermally conductive medium.

4. A heater apparatus for heating fluid, the heater apparatus comprising:

a thermally conductive mass;

heating means, thermally coupled to the thermally conductive mass, for imparting heat to the thermally conductive mass;

a fluid flow path formed in the mass between an inlet and an outlet, the fluid flow path coupled in heat transfer relation to the heating means so that fluid in the fluid flow path absorbs heat from the thermally conductive mass;

control means, connected to the heating means, for activating the heating means;

a thermally conductive medium coupled in heat transfer relationship between at least a portion of the control means and the thermally conductive mass to minimize a temperature differential between the thermally conductive mass and the ambient environment;

a thermal insulating member disposed on at least one surface of the thermally conductive mass;

the thermally conductive medium including a thermally conductive plate joined to the thermal insulating member and the thermally conductive mass; and wherein the thermally conductive plate is disposed in heat transfer relationship between the control means and the thermally conductive mass to transfer heat generated by the control means to the plate.

5. A heater apparatus for heating fluid, the heater apparatus comprising:

a thermally conductive mass;

heating means, thermally coupled to the thermally conductive mass, for imparting heat to the thermally conductive mass;

a fluid flow path formed in the mass between an inlet and an outlet, the fluid flow path coupled in heat transfer relation to the heating means so that fluid in the fluid flow path absorbs heat from the thermally conductive mass;

control means, connected to the heating means, for activating the heating means, the control means including a printed circuit board;

a thermally conductive medium coupled in heat transfer relationship between at least a portion of the control means and the thermally conductive mass to minimize a temperature differential between the thermally conductive mass and the ambient environment, the thermally conductive medium disposed in contact between the printed circuit board and the thermally conductive mass; and a thermal insulating member disposed between the thermally conductive mass and the thermally conductive medium.

6. A heater apparatus for heating fluid, the heater apparatus comprising:

a thermally conductive mass;

heating means, thermally coupled to the thermally conductive mass, for imparting heat to the thermally conductive mass;

a fluid flow path formed in the mass between an inlet and an outlet, the fluid flow path coupled in heat transfer relation to the heating means so that fluid in the fluid flow path absorbs heat from the thermally conductive mass;

control means, connected to the heating means, for activating the heating means;

a thermally conductive medium coupled in heat transfer relationship between at least a portion of the control means and the thermally conductive mass to minimize a temperature differential between the thermally conductive mass and the ambient environment;

a thermally insulating member disposed on at least one surface of the thermally conductive mass;

a thermally conductive plate joined to the thermal insulating member and the thermally conductive mass; and wherein the thermally conductive medium is disposed in heat transfer relationship between the control means and the thermally conductive plate to transfer heat generated by the control means to the plate.

7. A heater apparatus for heating fluid, the heater apparatus comprising:

a thermally conductive mass;

heating means, thermally coupled to the thermally conductive mass, for imparting heat to the thermally conductive mass;

a fluid flow path formed in the mass between an inlet and an outlet, the fluid flow path coupled in heat transfer relation to the heating means so that fluid in the fluid flow path absorbs heat from the thermally conductive mass;

control means, connected to the heating means, for activating the heating means, the control means including a printed circuit board, the printed circuit board including at least one bore extending therethrough the at least one bore fludically coupling the control means to a thermally conductive medium; and the thermally conductive medium coupled in heat transfer relationship between at least a portion of the control means and the thermally conductive mass to minimize a temperature differential between the thermally conductive mass and the ambient environment.

8. The heater apparatus of claim 7 wherein the thermally conductive medium comprises:
   a member formed of a high thermally conductive material.

9. The heater apparatus of claim 7 wherein the control means further comprises:
   a printed circuit board, the thermally conductive medium disposed in contact between the printed circuit board and the thermally conductive mass.

10. The heater apparatus of claim 9 further comprising:
    bores extending through the printed circuit board communication to the thermally conductive medium.

11. The heater apparatus of claim 7 wherein the control means further comprises:
    temperature sensor means, coupled to the control means, for generating an output signal proportional to the temperature of the thermally conductive mass.

12. The heater apparatus of claim 7 wherein:
    the heat conductive medium is disposed to conduct heat generated by the control means to the thermally conductive mass to reduce a temperature differential between the thermally conductive mass and the ambient environment.

13. The heater apparatus of claim 7 wherein the fluid flow path comprises:
    a first flow path portion extending across one surface of the thermally conductive mass; and
    a second flow path portion extending across an opposed surface of the thermally conductive mass, the first and second flow path portions disposed in fluid flow communication.

14. The heater apparatus of claim 13 wherein the first and second flow path portions are disposed in fluid flow communication substantially at the center of the thermally conductive mass.

15. The heater apparatus of claim 7 wherein the heating means comprises:
    at least one heater element mounted in the mass.

16. The heater apparatus of claim 15 wherein the heating means comprises:
    a plurality of heater elements mounted in the mass.

17. The heater apparatus of claim 16 further comprising:
    a controller for controlling the activation of each of the heater elements.

18. The heater apparatus of claim 7 wherein the heating means comprises:
    a calrod.

19. The heater apparatus of claim 7 wherein the heating means is disposed in the thermally conductive mass and substantially encompassed by the fluid flow path.

20. A heater apparatus for heating fluid, the heater apparatus comprising:
    a thermally conductive mass;
    a fluid flow path formed of a first flow path portion extending across one surface of the thermally conductive mass and a second flow path portion extending across an opposed surface of the thermally conductive mass, the first and second flow path portions disposed in fluid flow communication through the thermally conductive mass;
    at least one heating element thermally mounted in the thermally conductive mass and substantially contacted by the first and second flow path portions, the heating means imparting heat to the thermally conductive mass so that fluid in the first and second flow path portions absorbs heat from the thermally conductive mass;
    control means, including power switch means connected to the heating means, for activating the heating means the control means including a printed circuit board, the printed circuit board including at least one bore extending therethrough, the at least one bore fluidically coupling the control means to a thermally conductive medium; and
    the thermally conductive medium coupled in heat transfer relationship between at least a portion of the control means and the thermally conductive mass to minimize a temperature differential between the thermally conductive mass and the ambient environment.

21. The heater apparatus of claim 20 wherein the thermally conductive medium comprises:
    a member formed of a high thermally conductive material.

22. The heater apparatus of claim 20 wherein the control means further comprises:
    a printed circuit board, the thermally conductive medium disposed in registry between the printed circuit board and the thermally conductive mass.

23. The heater apparatus of claim 20 further comprising:
    bores extending through the printed circuit board in fluid communication with the thermally conductive medium.

24. The heater apparatus of claim 20 wherein the control means further comprises:
    temperature sensor means, coupled to the control means, for generating an output signal proportional to the temperature of the thermally conductive mass.

25. The heater apparatus of claim 20 wherein:
    the thermally conductive medium is disposed to conduct heat generated by the control means to the thermally conductive mass to reduce a temperature differential between the thermally conductive mass and the ambient environment.

26. The heater apparatus of claim 20 wherein the heating means comprises:
    a plurality of heater elements mounted in the mass.

27. The heater apparatus of claim 20 further comprising:
    a controller for controlling the individual activation of each of the heater elements.

28. The heater apparatus of claim 20 wherein the heating means comprises:
    a calrod.

29. A vehicle window wash apparatus comprises:
    a fluid source for supplying wash fluid;
    a fluid discharge device fluidically coupled to the fluid source for discharging fluid from the reservoir;
    a heater means disposed in fluid flow communication between the fluid source and the fluid discharge device; and
    a controller, coupled to the heater means for supplying power to the heater means;
    the heater apparatus including:
    a thermally conductive mass having an inlet and an outlet;
    a fluid flow path formed in the mass between the inlet and the outlet, the fluid flow path substantially enveloping the heating means so that fluid in the fluid flow path absorbs heat from the thermally conductive;
    control means, connected to the heating means, for activating the heating means, the control means including a printed circuit board, the printed circuit board including at least one bore extending therethrough, the at least one bore fluidically coupling the control means to a thermally conductive medium; and the thermally conductive medium coupled in heat transfer relationship between at least a portion of the control means and the thermally conductive mass to minimize a temperature differential between the thermally conductive mass and the ambient environment.

30. The heater apparatus of claim 29 wherein the heat conductive medium comprises:

a member formed of a high thermally conductive material.

31. The heater apparatus of claim 29 wherein the control means further comprises:

a printed circuit board, the heat conductive medium disposed in registry between the printed circuit board and the thermally conductive mass.

32. The heater apparatus of claim 31 further comprising:

bores extending through the printed circuit board in fluid communication with the heat conductive medium.

33. The heater apparatus of claim 29 wherein the control means further comprises:

temperature sensor means, coupled to the control means, for generating an output signal proportional to the temperature of the thermally conductive mass.

34. The heater apparatus of claim 29 wherein:

the heat conductive medium is disposed to conduct heat generated by the control means to the thermally conductive mass to reduce a temperature differential between the thermally conductive mass and the ambient environment.

* * * * *